United States Patent
Chang et al.

(10) Patent No.: US 8,924,723 B2
(45) Date of Patent: Dec. 30, 2014

(54) MANAGING SECURITY FOR COMPUTER SERVICES

(75) Inventors: John Y. Chang, Austin, TX (US); Ching Y. Chao, Austin, TX (US); Hyen V. Chung, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/289,181

(22) Filed: Nov. 4, 2011

(65) Prior Publication Data

US 2013/0117564 A1 May 9, 2013

(51) Int. Cl.
| | |
|---|---|
| H04L 9/32 | (2006.01) |
| G06F 9/455 | (2006.01) |
| G06F 21/57 | (2013.01) |
| H04L 29/06 | (2006.01) |
| G06F 21/00 | (2013.01) |
| G06F 21/44 | (2013.01) |

(52) U.S. Cl.
CPC .......... *H04L 9/3268* (2013.01); *G06F 9/45558* (2013.01); *G06F 2009/45587* (2013.01); *H04L 9/3234* (2013.01); *G06F 21/575* (2013.01); *H04L 63/0823* (2013.01); *H04L 63/0807* (2013.01); *G06F 21/00* (2013.01); *G06F 21/445* (2013.01)
USPC ....................................................... 713/168

(58) Field of Classification Search
CPC .............................. G06F 21/00; H04L 9/3268
USPC ........................................................... 713/168
See application file for complete search history.

(56) References Cited

U.S. PATENT DOCUMENTS

| | | | | |
|---|---|---|---|---|
| 8,161,479 | B2 * | 4/2012 | Sedukhin et al. .................. | 718/1 |
| 2006/0206932 | A1 * | 9/2006 | Chong ............................ | 726/10 |
| 2009/0125722 | A1 * | 5/2009 | Gomaa et al. .................. | 713/176 |
| 2010/0211781 | A1 | 8/2010 | Auradkar et al. | |
| 2011/0004916 | A1 | 1/2011 | Schiffman et al. | |
| 2011/0126197 | A1 | 5/2011 | Larsen et al. | |
| 2011/0126207 | A1 * | 5/2011 | Wipfel et al. .................. | 718/104 |
| 2012/0060025 | A1 * | 3/2012 | Cahill ............................ | 713/155 |
| 2012/0266231 | A1 * | 10/2012 | Spiers et al. .................... | 726/12 |
| 2014/0032920 | A1 * | 1/2014 | Gehrmann et al. ........... | 713/176 |

OTHER PUBLICATIONS

Mell et al, "The NIST Definition of Cloud Computing", v15, Oct. 7, 2009.

* cited by examiner

*Primary Examiner* — Peter Shaw
(74) *Attorney, Agent, or Firm* — Paul S. Drake

(57) ABSTRACT

A system or computer usable program product for providing security for a business application including receiving a request from a server including a server public key and a security token, deploying a virtual node implementing the business application in response to the request, using the security token in a bootstrap process by the virtual node to provide authentication to the server, and authenticating a message from the server using a server public key.

20 Claims, 8 Drawing Sheets

FIG. 7

| Field | ID |
|---|---|
| User ID | 400 |
| Deployment ID | 405 |
| Expiration Time | 410 |
| Authorization Attributes | 415 |
| Custom Attributes | 420 |
| Owner Process Type ID | 425 |
| Owner Public Key ID | 430 |
| Issuer Process Type ID | 435 |
| Issuer Key ID | 440 |
| Issuer Digital Signature | 445 |
| Owner Digital Signature | 450 |

MANAGING SECURITY FOR COMPUTER SERVICES

BACKGROUND

1. Technical Field

The present invention relates generally to managing security for computer services, and in particular, to a computer implemented method for providing security for requested services in a cloud environment.

2. Description of Related Art

Computing devices have traditionally executed applications and data services locally. That is, data may be accessed, processed, stored and provided using local computing devices with minimal concern about interference or exposure of user data to third parties unless the computing device is stolen.

With the advent of the internet and more recently cloud computing, applications and services are increasingly being moved to network providers or other third parties to provide these applications and services on behalf of a user's computing devices. As a result, a user may become concerned with third parties accessing or interfering with the user's data during the uploading, storage, processing or downloading of that data. Accordingly, it is desirable to increase the security of the user's data in connections with these applications and services.

SUMMARY

The illustrative embodiments provide a method, system, and computer usable program product for providing security for a business application including receiving a request from a server including a server public key and a security token, deploying a virtual node implementing the business application in response to the request, using the security token in a bootstrap process by the virtual node to provide authentication to the server, and authenticating a message from the server using a server public key.

BRIEF DESCRIPTION OF THE SEVERAL VIEWS OF THE DRAWINGS

The novel features believed characteristic of the invention are set forth in the appended claims. The invention itself, further objectives and advantages thereof, as well as a preferred mode of use, will best be understood by reference to the following detailed description of illustrative embodiments when read in conjunction with the accompanying drawings, wherein:

FIG. 7 depicts a block diagram of a security token which may be implemented in accordance with various embodiments;

DETAILED DESCRIPTION

Figure 1:
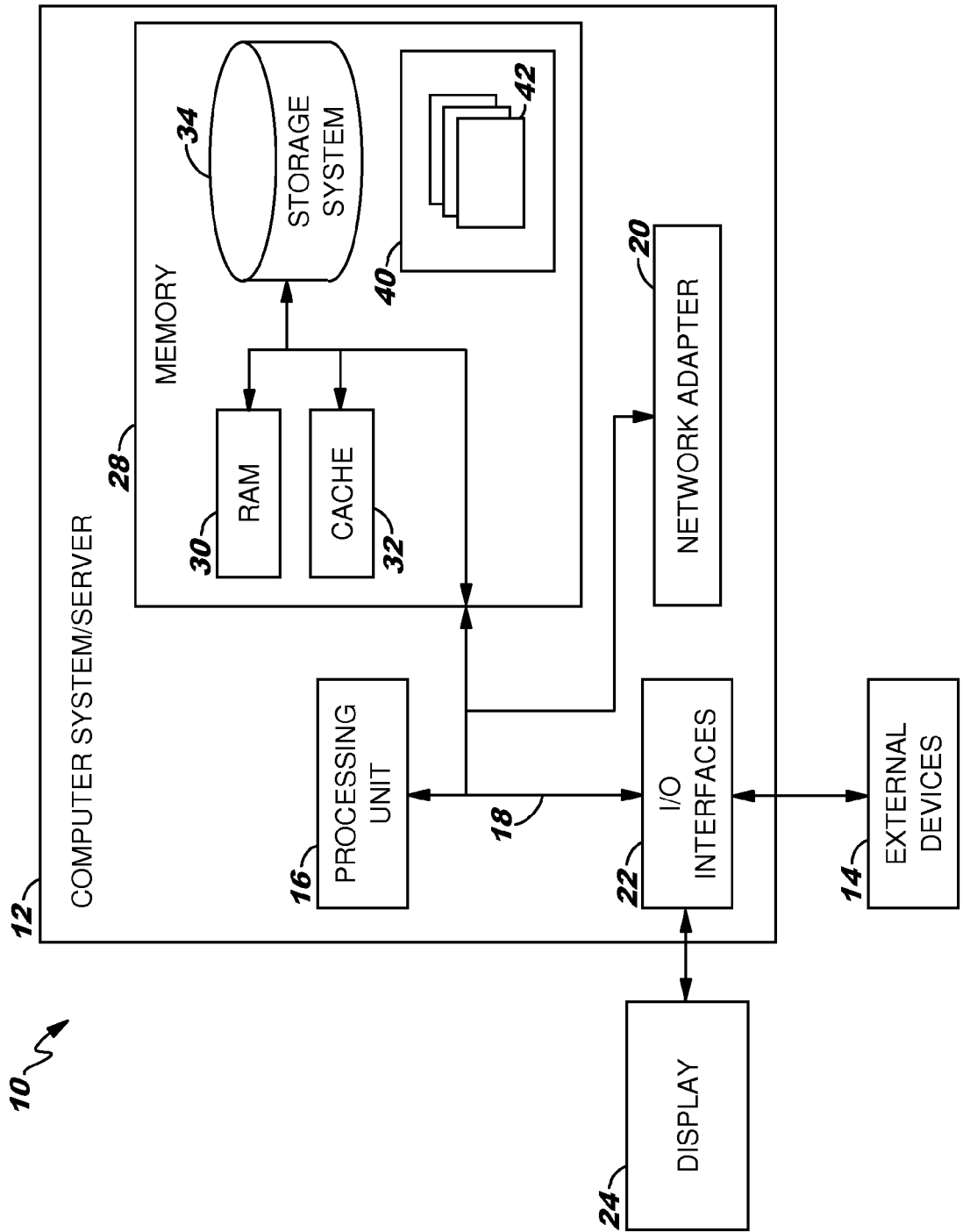
FIG. 1 depicts a cloud computing node according to an embodiment of the present invention in which various embodiments may be implemented.

Steps may be taken to provide cloud based security for business applications. These steps may be taken as will be explained with reference to the various embodiments below.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

For convenience, the Detailed Description includes the following definitions which have been derived from the "Draft NIST Working Definition of Cloud Computing" by Peter Mell and Tim Grance, dated Oct. 7, 2009, which is cited in an IDS filed herewith, and a copy of which is attached thereto.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in as needed. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node (also referred to herein as a virtual node or virtual machine) is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
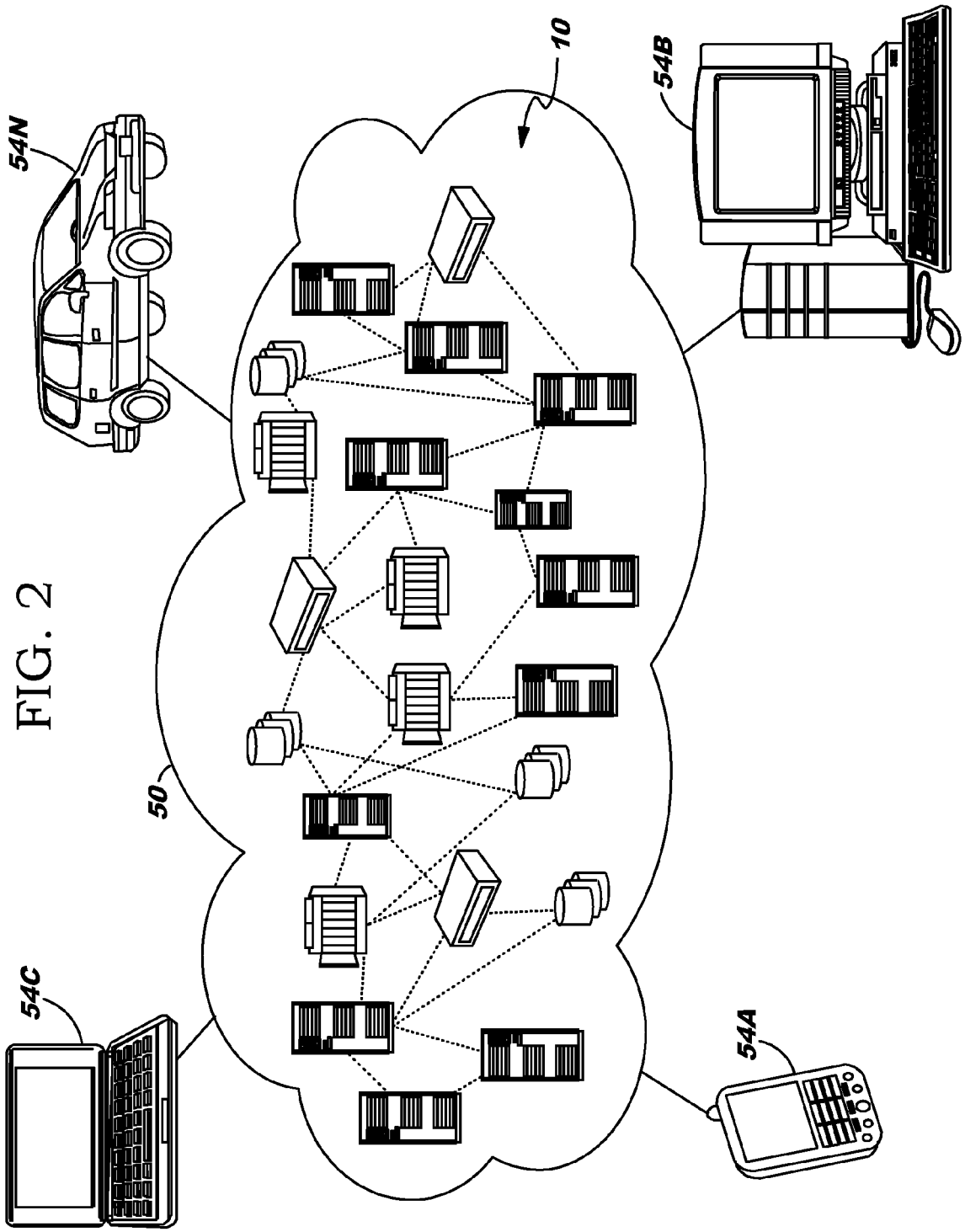
FIG. 2 depicts a cloud computing environment in which various embodiments may be implemented.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
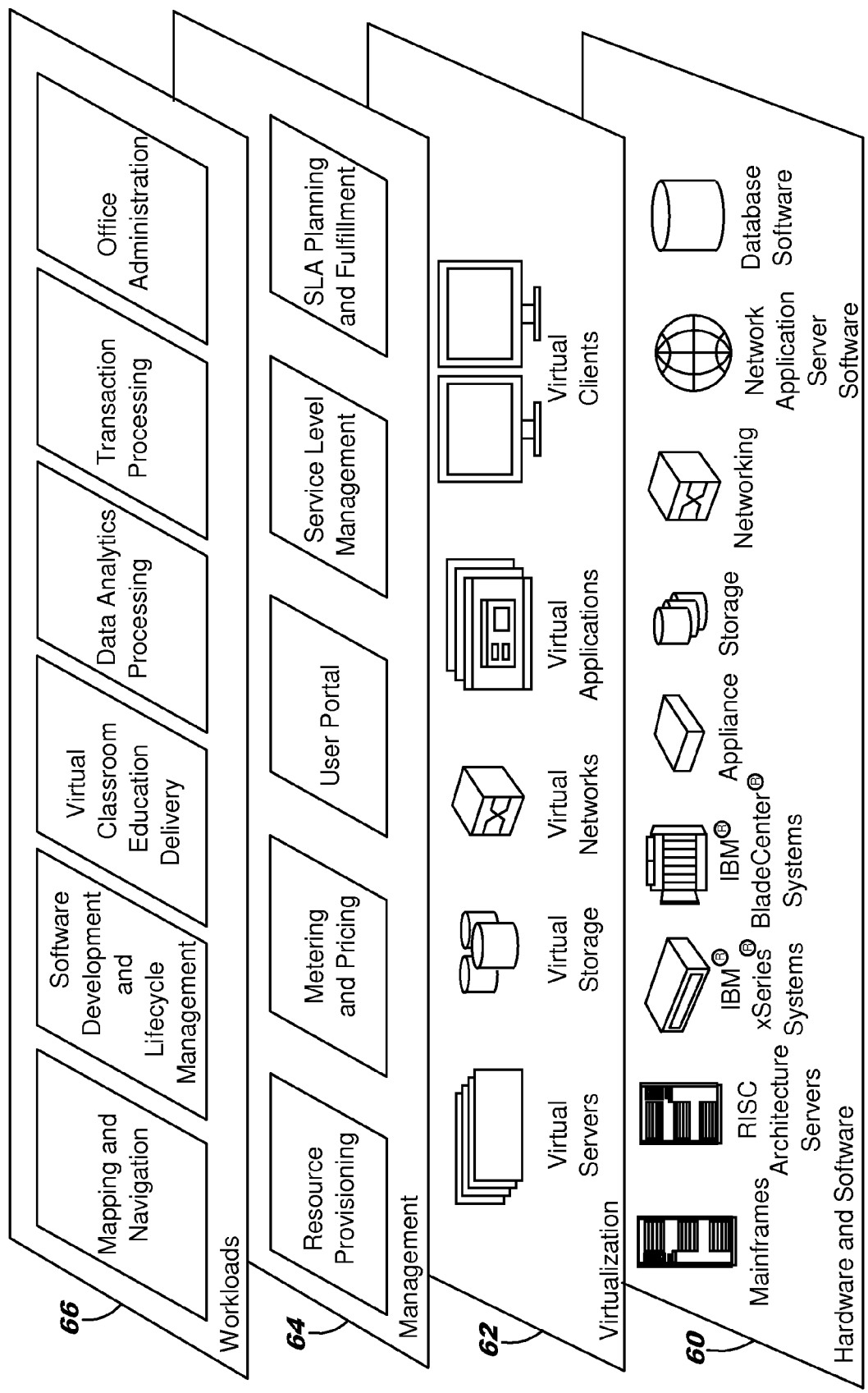
FIG. 3 depicts abstraction model layers in which various embodiments may be implemented.

Referring now to FIG. 3, a set of functional abstraction layers provided by cloud computing environment (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; a type of cloud computing platform referred to herein as an appliance; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment including providing for secure and trusted communications. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and an office administration.

Figure 4:
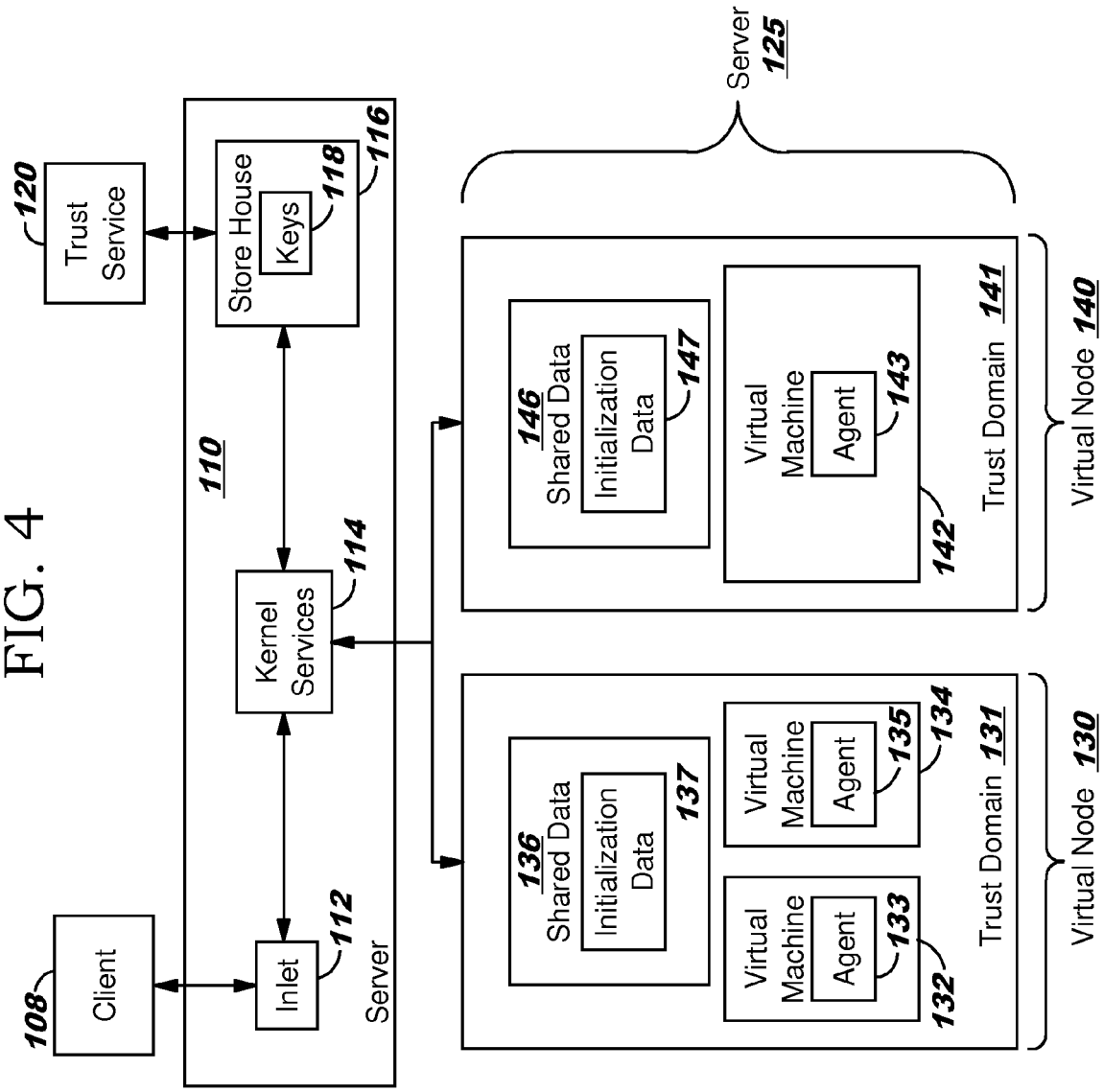
FIG. 4 depicts a block diagram of a server which has deployed and provisioned virtual nodes for performing workloads in a cloud computing environment in which various embodiments may be implemented.

FIG. 4 depicts a block diagram of a server which has deployed and provisioned virtual nodes for performing workloads in a cloud computing environment in which various embodiments may be implemented. Server 110 may be a cloud computing platform such as an appliance that includes the hardware, storage, networking, virtualization and service management software utilized in a cloud computing environment. The server may provide a virtualized deployment and provisioning environment, store networking and service management systems for the provisioning and deployment of virtual nodes. Those elements of a server utilized for provisioning and deploying virtual nodes are described herein. Other types of devices may be utilized to implement the various embodiments of the invention including general purposes computer systems in a cloud computing environment.

In this embodiment, server 110 includes three primary server processes including an inlet 112, kernel services 114 and storehouse 116. Inlet 112 is a contact point or user interface for one or more clients 108 such as browsers, Java clients, script clients, etc. Kernel service 114 is the command center that manages most operation requests. These requests could include managing the provision and deployment of virtual nodes to perform certain requested functions in a cloud computing environment. Storehouse 116 is a database that includes a repository of certain configuration data and binary images. Storehouse 116 contains a secure key repository 118 for storing tokens, private keys, public keys, etc. used for security purposes. These keys may be acquired from a trust service 120. Alternative server processes and resources may be used for performing the same or similar functions.

Server 110 provisions and deploys one or more virtual nodes or cloud computing nodes in a cloud computing environment, each virtual node containing a trust domain shared by one or more virtual machines for providing computing services. Each virtual node may reside in a server 125 located in a cloud environment. A request to provision and deploy one or more virtual machines within a trust domain may be received from a browser by inlet 112. That request is then passed to kernel services 114 to manage the fulfillment of that request. Kernel Services 114 then obtains certain information from storehouse 116 such as configuration information. These functions may be performed by other types of software and hardware.

One or more virtual machines are established sharing a common trust domain are collectively referred to herein as a virtual node. For example, virtual machines 132 and 134 are sharing a single trust domain 131 within virtual node 130 preferably on a single server within the cloud environment. By sharing trust domain 131 in a single server 125, virtual machines 132 and 134 trust each other and share common data such as security tokens and PKI keys as well as server software and hardware resources. The combination of virtual nodes, trust domain and shared data and resources is referred to herein as virtual node 130. In a cloud environment, each virtual node is preferably on a single server 125 for maintaining security and operational efficiency due to shared hardware and software resources. In addition, multiple virtual nodes may run on a single server within a cloud environment, although additional security precautions may be established due to shared server software and hardware resources.

A virtual node may have multiple virtual machines within a single trust domain for performing a variety of services. For example, virtual machine 132 may be managing a database and virtual machine 134 may be utilizing the data stored in the database for performing certain business functions. By sharing the same trust domain within a virtual node, both services can be performed collectively and more efficiently. In another example, virtual machine may be performing a certain business function and as demand increases, another virtual machine may be created to assist in handling that increased demand and for load balancing.

Virtual machine 142 is a single virtual machine within trust domain 141 with shared data 146 and collectively referred to as virtual node 140. Although there is a single virtual machine 142 within virtual node 140, additional virtual machines may be quickly and easily added sharing the same trust domain while maintaining security for the virtual node.

Each virtual machine includes an agent 133, 135 and 143 for managing the activities of the virtual machine. Each virtual node has a shared data section 136 and 146 for storing data shared among the virtual machines within that virtual node. Each shared data section contains initialization data 137 and 147 which was used during the process of establishing the trust domain and virtual machines. Each shared data section contains keys and other data used for secure communications. In alternate embodiments, any or all of the shared data may be stored in each virtual machine within the virtual node.

Figure 5:
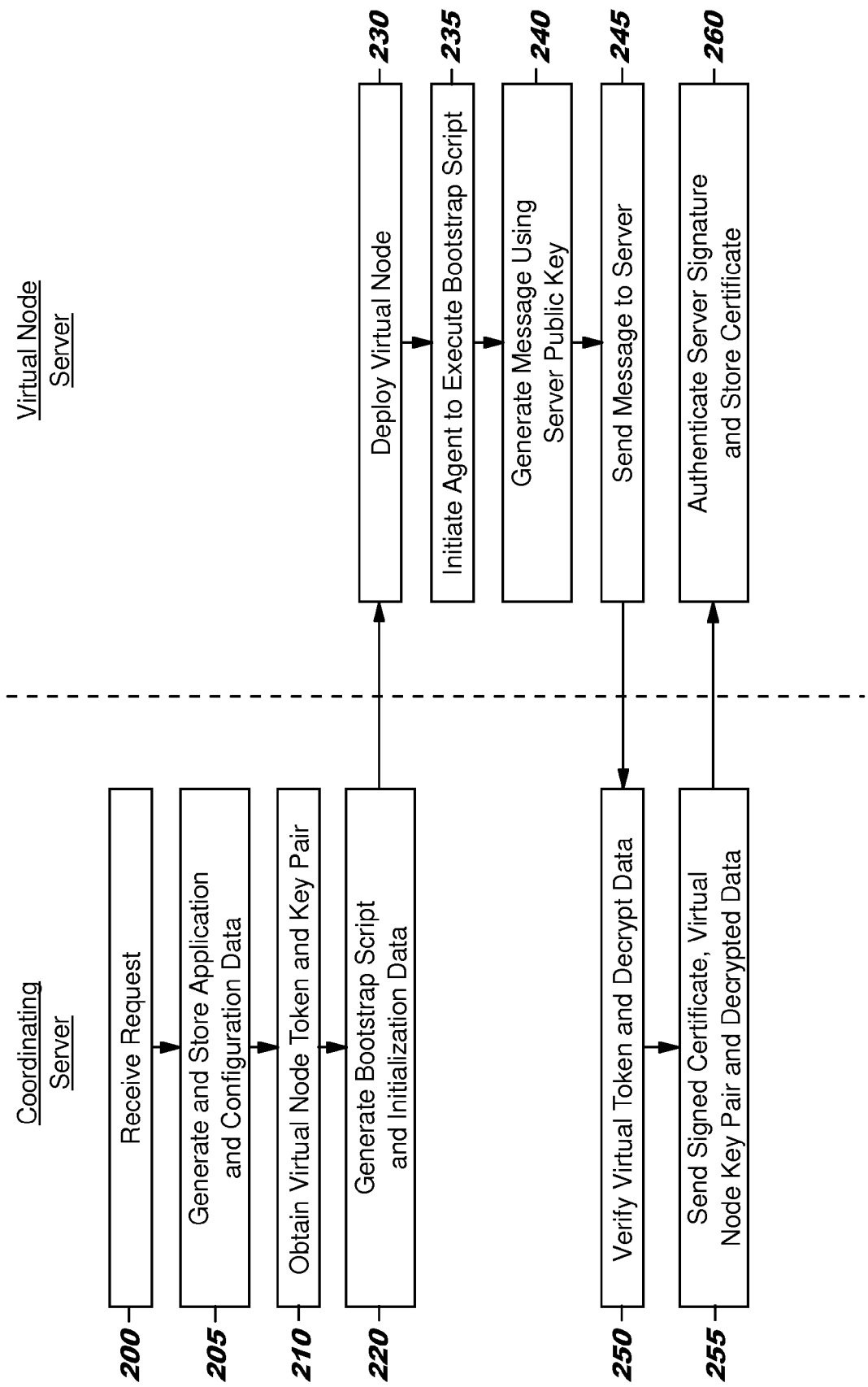
FIG. 5 depicts a flow diagram of a server deploying and provisioning a virtual node in accordance with a first embodiment.
Figure 6:
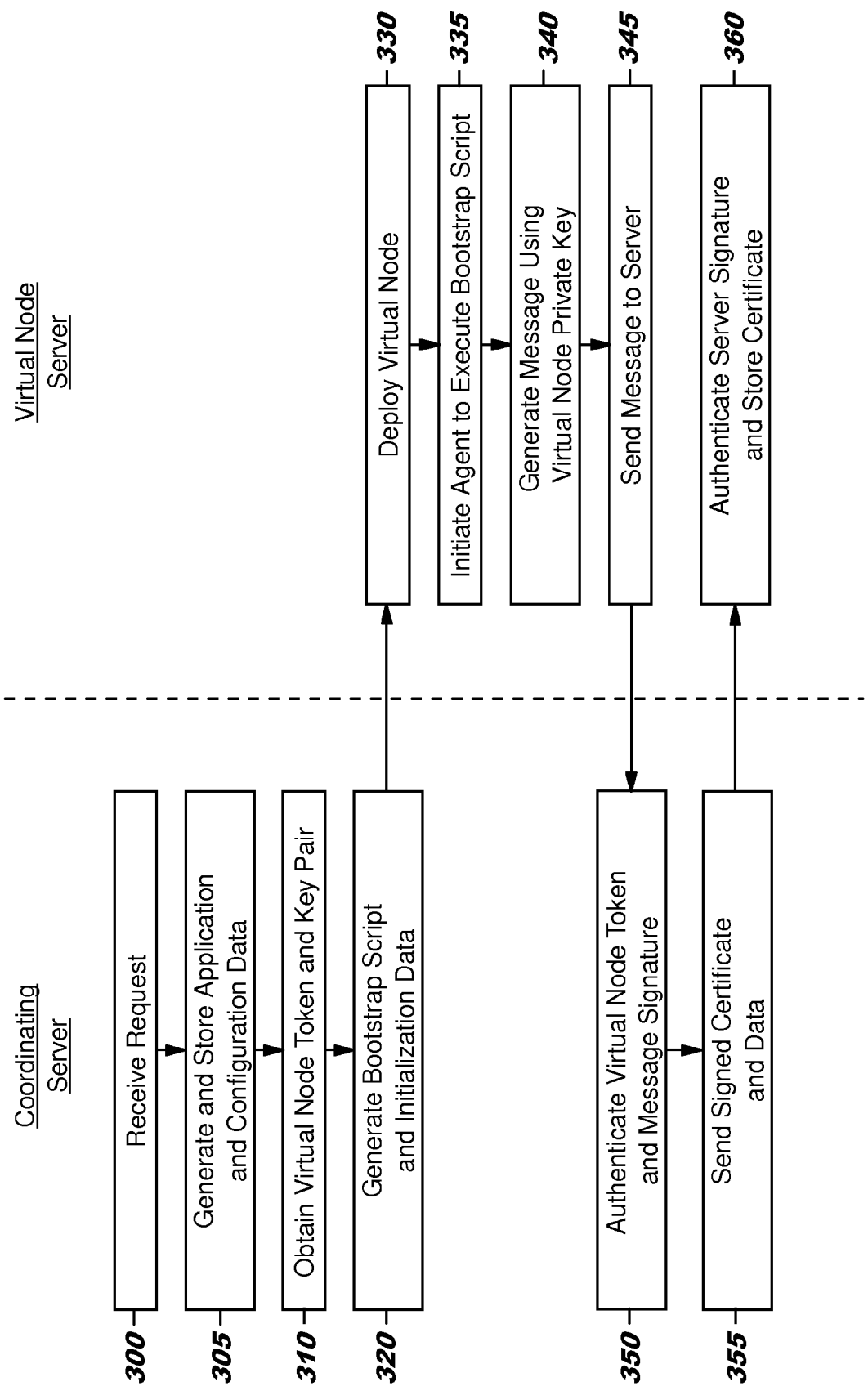
FIG. 6 depicts a flow diagram of a server deploying and provisioning a virtual node in accordance with a second embodiment.

FIGS. 5 and 6 are directed to a server deploying and provisioning a virtual node including at least one virtual machine within a trust domain, all within a cloud environment. The initial process of deploying establishes the primary structures and initial operation of a virtual node. A secondary process of provisioning provides the data and resources for the deployed virtual node to perform the desired business application(s). The initial process of deploying also downloads a minimum of initialization data to the virtual node, including a bootstrap script for running the provisioning process. The bootstrap script allows the virtual node to manage its' own provisioning, which is more secure than utilizing a remote server to manage that provisioning. Trust relationships are also established between the server and the virtual node through these processes.

Initialization data is minimal in size to reduce the amount of overhead needed to deploy a virtual node and to reduce the amount of information that may be intercepted as a virtual node is being deployed for security purposes. The size of initialization data may also be limited by various hardware and software implementations. As a result, initialization data may be only large enough to download essential data for initiating and performing the bootstrap process for the virtual node. It is due to these limitations and security concerns that a bootstrap process is utilized to securely manage the provisioning of the virtual node.

FIG. 5 depicts a flow diagram of a server deploying and provisioning a virtual node in accordance with a first embodiment. This flow diagram is described with reference to the structures shown in FIGS. 3 and 4, although other embodiments could easily be utilized by one of ordinary skill in the art. The example described below is for a single virtual machine in a trust domain as shown in virtual node 140 and server 125 of FIG. 4, although multiple virtual machines in a trust domain may be similarly implemented.

In step 200 a coordinating server, such as an appliance shown in hardware and software 60, receives a service request from a client, such as a browser. This request may be for certain functions or applications to be performed (herein referred to as a business application) such as described with reference to workloads 66 of FIG. 3. The request may specify that the business application be performed by a virtual node or the request may not specify whether the server or a virtual node perform the requested business application. The server receives that request such as with inlet 112 which is passed to kernel services 114 for managing the request using the resources of storehouse 116 in accordance with FIG. 4 described above, although alternative embodiments may be utilized to accomplish the same or similar functions.

The coordinating server then coordinates the deployment and provisioning of a virtual machine within a trust domain in a virtual node on a virtual node server in steps 205 through 220. Based on the request, business application data and configuration data is generated and stored in storehouse 116 in step 205 for loading into the virtual node during a bootstrap process described below with reference to steps 230 through 260. In addition, in step 210 a security token and an RSA key pair (public and private) for the virtual node is obtained from trust service 120 and stored in key repository 118. The trust service generated another administrative RSA key pair specific to the virtual node and signed the security token using the private key of that administrative key pair by hashing the token and signing that hash using the internal private key. The signed hash is then appended to the token as shown in FIG. 7 below. A server RSA key pair may have been previously obtained by the server and stored in key repository 118. Alternative embodiments may use other types of security keys or tools for maintaining secure communications.

Alternative embodiments could use various hashing techniques or hash other parts of the token including the whole token. However, there is a balance between enhancing security versus reducing the overhead used to enhance that security. This signed security token then becomes the identification data used by the virtual node when communicating with the server as described below.

A script is then generated in step 220 to execute the bootstrap process described below. Initialization data for the virtual node is also generated including the virtual node security token, server RSA public key and script for the bootstrap process. Initialization data is small in size to reduce the amount of overhead needed to deploy a virtual node or to reduce the amount of information that may be intercepted as a virtual node is being deployed. The size of initialization data may also be limited by various hardware and software implementations. As a result, initialization data may be only large enough to download essential data for initiating and performing the bootstrap process for the virtual node.

In step 230, virtual machine 142 is deployed within trust domain 141 in a virtual node 140 on a virtual node server 125 in a cloud computing environment. This includes allocating the computing and storage resources necessary for fulfilling the requested workload and downloading the initialization data for storage in the shared data section of the virtual node. In step 235 the agent for the virtual machine is initiated and starts executing the script for the bootstrap process as described with reference to steps 240 to 260.

In step 240, the virtual machine agent generates a message to the server including the virtual node security token and a virtual node signature. The message includes the virtual node token received above and some random data is encrypted using the server public key. The server public key is used because the virtual node does not yet have its private key, which will be provided during the bootstrap process. Once the virtual node has received the virtual node private key in subsequent communications from the server, the virtual node signature uses that private key for all subsequent messages. The message is then sent to the server in step 245 in order to establish a secure communication pathway such as SSL. This will enhance secure communications between the coordinating server and the virtual node (within the virtual node server) and help prevent "man in the middle" type of attacks.

In step 250, the coordinating server receives and verifies the virtual node signature in the message by comparing the virtual node token against the previously stored virtual node token. The coordinating server also decrypts the encrypted data using the server private key. In step 255, the coordinating server generates and sends a message to the virtual node including the decrypted data, the server x.509 certificate, and the virtual node private and public keys. This message is signed by the coordinating server using the same process described above with reference to step 215. The certificate may also be signed by the coordinating server using the server private key.

In step 260, the virtual machine agent 143 authenticates the coordinating server signature in the message by decrypting the signature using the server public key, hashing the same elements that were hashed by the server, and comparing the two results. This process verifies that the communication link was established with the proper server. However, if the hash results do not match, then there may be a security issue and the message will not be accepted. With a successful authentication, the server security certificate and the virtual node private and public keys are stored in memory for future communications with the server.

In an alternative embodiment, the virtual node private key is retained in the coordinating server memory, which is in variance with standard practice of only the owner of a private key maintaining a copy of that private key. However, as a result of this variance, if the virtual node fails, it can be reconstructed and reestablished quickly by the coordinating server without having to restart from scratch the service request which initiated this process.

Figure 9:
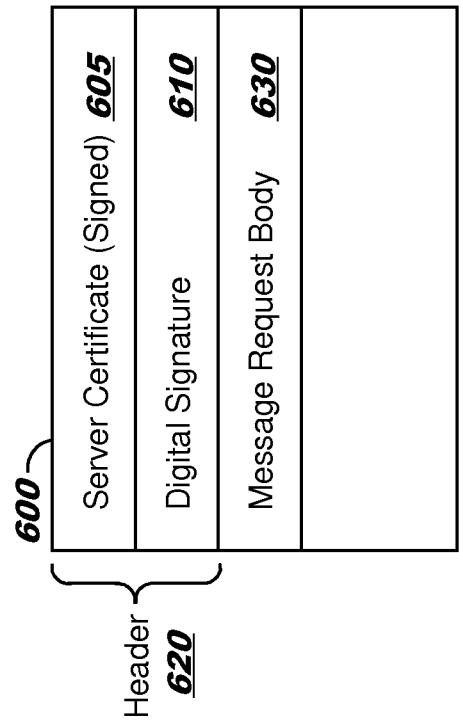
FIG. 9 depicts a diagram of a communication data structure sent from the server to the virtual node in accordance with various embodiments.
Figure 8:
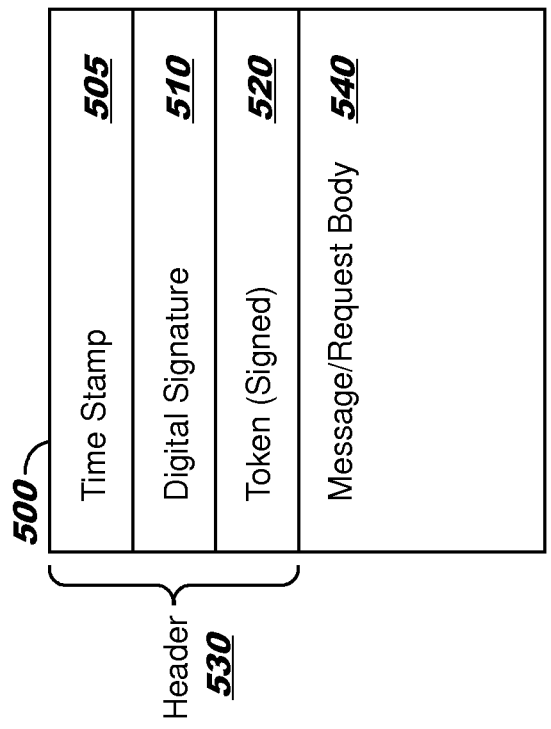
FIG. 8 depicts a diagram of a communication data structure sent from a virtual node to the server in accordance with various embodiments.

Processing can continue with secure communications using the data structures as shown in FIGS. 8 and 9 below to continue loading configuration data and application programming to perform the requested service.

FIG. 6 depicts a flow diagram of a server deploying and provisioning a virtual node in accordance with a second embodiment. This flow diagram is described with reference to the structures shown in FIGS. 3 and 4, although other embodiments could easily be utilized by one of ordinary skill in the art. The example described below is for a single virtual machine in a trust domain as shown in virtual node 140 and server 125 of FIG. 4, although multiple virtual machines in a trust domain may be similarly implemented.

In step 300 a coordinating server, such as an appliance shown in hardware and software 60, receives a service request from a client, such as a browser. This request may be for certain functions or applications to be performed (herein referred to as a business application) such as described with reference to workloads 66 of FIG. 3. The request may specify that the business application be performed by a virtual node or the request may not specify whether the server or a virtual node perform the requested business application. The server receives that request such as with inlet 112 which is passed to kernel services 114 for managing the request using the resources of storehouse 116 in accordance with FIG. 4 described above, although alternative embodiments may be utilized to accomplish the same or similar functions.

The coordinating server then coordinates the deployment and provisioning of a virtual machine within a trust domain in a virtual node on a virtual node server in steps 305 through 320. Based on the request, business application data and configuration data is generated and stored in storehouse 116 in step 305 for loading into the virtual node during a bootstrap process described below with reference to steps 330 through 360. In addition, in step 310 a security token and an RSA key pair (public and private) for the virtual node is obtained from trust service 120 and stored in key repository 118. The trust service generated another administrative RSA key pair specific to the virtual node and signed the security token using the private key of that internal key pair by hashing the token and signing that hash using the administrative private key. The signed hash is then appended to the token as shown in FIG. 7 below. A server RSA key pair may have been previously obtained by the server and stored in key repository 118. Alternative embodiments may use other types of security keys or tools for maintaining secure communications.

Alternative embodiments could use various hashing techniques or hash other parts of the token including the whole token. However, there is a balance between enhancing security versus reducing the overhead used to enhance that security. This signed security token then becomes the identification data used by the virtual node when communicating with the server as described below.

A script is then generated in step 320 to execute the bootstrap process described below. Initialization data for the virtual node is also generated including the virtual node security token, virtual node public and private key pair, server RSA public key and script for the bootstrap process. Initialization data is small in size to reduce the amount of overhead needed to deploy a virtual node or to reduce the amount of information that may be intercepted as a virtual node is being deployed. The size of initialization data may also be limited by various hardware and software implementations. As a result, initialization data may be only large enough to download essential data for initiating and performing the bootstrap process for the virtual node.

In step 330, virtual machine 142 is deployed within trust domain 141 in a virtual node 140 on a virtual node server 125 in a cloud computing environment. This includes allocating the computing and storage resources necessary for fulfilling the requested workload and downloading the initialization data for storage in the shared data section of the virtual node. In step 235 the agent for the virtual machine is initiated and starts executing the script for the bootstrap process as described with reference to steps 340 to 360.

In step 340, the virtual machine agent generates a message to the server including the virtual node security token and a virtual node signature. The message includes the virtual node token received above and the message is signed using the virtual node private key received in the initialization data. This signature is performed by hashing the message time stamp, encrypting the hash using the virtual node private key, and appending that encrypted hash to the message. Alternative embodiments could use various hashing techniques or hashing other parts of the message including the whole message. The message is then sent to the server in step 345 in order to establish a secure communication pathway such as SSL. This will enhance secure communications between the coordinating server and the virtual node (within the virtual node server) and help prevent "man in the middle" type of attacks.

In step 350, the coordinating server receives and authenticates the virtual node signature in the message by comparing the virtual node token against the previously stored virtual node token and verifies the signature using the virtual node public key to decrypt the signed hash and compare that to a hash of the same elements from the message. In step 355, the coordinating server generates and sends a message to the virtual node including the decrypted random data, the server x.509 certificate. This message is signed by the coordinating server using the same process described above with reference to step 315. The certificate may also be signed by the coordinating server using the server private key.

In step 360, the virtual machine agent 143 authenticates the coordinating server signature in the message by decrypting the signature using the server public key, hashing the same elements that were hashed by the server, and comparing the two results. This process verifies that the communication link was established with the proper server. However, if the hash results do not match, then there may be a security issue and the message will not be accepted. With a successful verification, the server security certificate and the virtual node private and public keys are stored in memory for future communications with the server.

In an alternative embodiment, the virtual node private key is retained in the coordinating server memory, which is in variance with standard practice of only the owner of a private key maintaining a copy of that private key. As a result, as a result of this variance, if the virtual node fails, it can be reconstructed and reestablished quickly by the coordinating server without having to restart from scratch the service request which initiated this process.

Processing can continue with secure communications using the data structures as shown in FIGS. 8 and 9 below to continue loading configuration data and application programming to perform the requested service.

FIG. 7 depicts a block diagram of a security token which may be implemented in accordance with various embodiments. A variety of elements are included in this token which may vary with alternative embodiments. The various IDs (identifiers) within the token may be IDs known to the trusted source that generated the token. This allows other entities or processes to query the trusted source to identify the ID'd entity or process. A security token may be utilized as an identifier within digital communications by various types of entities including servers, virtual nodes, business processes, etc. In this case, the token will be described as an identifier for a virtual node such as virtual node 140 of FIG. 4 described above. Examples of the use of such a token within a communication are shown below with reference to FIGS. 8 and 9.

User ID 400 is an identifier of the cloud user (e.g. business process, client, etc.) requesting the services being handled by the virtual node. This ID allows the receiver of a communication including this token to quickly identify the cloud user. Deployment ID 405 is an identifier of the virtual node that is deployed to perform the requested service for the cloud user. Expiration time 410 provides the lifetime of the token. Once expired, a new token will need to be generated, implemented and utilized to replace the expired token. Authorization attributes 415 include the authorization attributes of the cloud user such as security roles (e.g. administrator, user, etc.) or other attributes which may affect the resulting attributes allocated to the virtual node performing the services for the cloud user. For example, if the cloud user is an administrator with broad authorization to access sensitive data, the virtual node performing services for the cloud user may also have the same access rights. Custom attributes 420 includes other customizations that may be implemented.

Owner process type ID 425 includes an identifier of the process that owns or maintains the token such as the inlet or kernel service. Owner public key ID 430 includes an identifier for validating token ownership. Issuer process type ID 435 includes an identifier for representing the process that issues the token which is generally the trust service for the particular deployment of the virtual node. That is, a trust service may have many IDs, one for each virtual node deployment. Issuer public key ID 440 includes an identifier of a public key for validating token integrity. Issuer digital signature 445 includes a signature generated by the owner using the owner's private key for validating token integrity. The issuer digital signature is generated by hashing the expiration time of the token (or other elements thereof) and encrypting that hash with the issuer internal private key for the virtual node. The issuer public key provided above may be used to verify the token by decrypting the signature with the public key and comparing the result to a hash of the expiration time. If there is a difference, then the token may have been corrupted.

An owner digital signature may also be appended to the token to increase security. This may be an addition to the token not known to the trust service. That is, the server may generate a digital signature by hashing various elements of the token including the virtual node deployment ID 405, the expiration time of the token 410 and the issuer process type ID 435, encrypting that hash using the server private key, and appending the encrypted hash to the token as owner digital signature 450. Alternative embodiments could use various hashing techniques or hash other parts of the token including the whole token. However, there is a balance between enhancing security versus reducing the overhead used to enhance that security. This signed security token then becomes the identification data used by the virtual node when communicating with the server as described above.

FIG. 8 depicts a diagram of a communication data structure 500 sent from a virtual node to the server in accordance with various embodiments. Alternative embodiments could utilize alternative or additional elements as desired.

A time stamp 505 is included which provides the time the communication was generated by a virtual node. A time stamp allows a receiver of the communication to verify that the communication is not stale or older than would be expected. In addition, a digital signature 510 is created using the time stamp to both verify the identity of the sender and to verify the time the message was sent. In this case, the digital signature is generated by hashing the time stamp and then encrypting that hash using a key. In the case of the first embodiment described above with reference to FIG. 5, the initial key used is the public key of the server. This is because the virtual node does not have its private key yet during that initial communication. However, in all future communications in that embodiment, the virtual node private key may be used as it is known by the virtual node at that time. In the case of the second embodiment described above with reference to FIG. 6, the virtual node private key may be used for all communication as that key was provided to the virtual node in the initialization data.

Also included in the communication data structure is a signed copy of the security token 520 of the virtual node. This token is used to identify the virtual node and to also verify that the token has not been corrupted or tampered with by checking the digital signature as shown in FIG. 7 above. Time stamp 505, digital signature 510 and token 520 collectively comprise the header of the communication. The remainder of the communication data structure includes body 540 of a message or request from the virtual node to the server.

FIG. 9 depicts a diagram of a communication data structure 600 sent from the server to the virtual node in accordance with various embodiments. Alternative embodiments could utilize alternative or additional elements as desired.

Included in the communication data structure is a signed copy of the server certificate 605. This is used by the virtual node to authenticate that the message is a communication from the server and to also verify that the certificate has not been corrupted or tampered with by checking the digital signature.

Certificate 605 and digital signature 610 and token 520 collectively comprise the header 620 of the communication. The remainder of the communication data structure includes body 630 of a message or request from the server to the virtual node.

The invention can take the form of an entirely software embodiment, or an embodiment containing both hardware and software elements. In a preferred embodiment, the invention is implemented in software or program code, which includes but is not limited to firmware, resident software, and microcode.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), or Flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code such as web conference applications or plug-ins. A client data processing system may download that computer usable code, such as for storing on a data storage medium associated with the client data processing system, or for using in the client data processing system. The server data processing system may similarly upload computer usable code from the client data processing system such as a content source. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A computer usable program product comprising a non-transitory computer usable storage medium including computer usable code for use in providing security for a business application, the computer usable program product comprising code for performing the steps of:
    receiving a request from a requesting server to establish a virtual node including deploying and securely provisioning the virtual node prior to utilizing the virtual node for performing the business application, the request including a bootstrap process generated by the server to securely manage provisioning of the virtual node, a server public key and a security token;
    deploying on a virtual node server the virtual node implementing the business application in response to the request;
    using the security token in the bootstrap process by the deployed virtual node to provide authentication to the requesting server to request encrypted initialization data for provisioning the deployed virtual node to perform the business application;
    decrypting and authenticating a message from the requesting server using the server public key, the message including encrypted initialization data for provisioning the virtual node to perform the business application; and
    utilizing the decrypted initialization data to provision the virtual node, thereby deploying and securely provisioning the virtual node in response to the request.

2. The computer usable program product of claim 1 wherein the virtual node uses the server public key in the bootstrap process to obtain authentication of the requesting server.

3. The computer usable program product of claim 1 wherein the request includes a virtual node private key and the virtual node uses the virtual node private key in the bootstrap process to provide authentication to the requesting server.

4. The computer usable program product of claim 3 wherein the virtual node uses the virtual node private key to sign a set of data in the bootstrap process.

5. The computer usable program product of claim 4 wherein the virtual node uses the virtual node private key to sign a set of data received from the requesting server.

6. The computer usable program product of claim 1 wherein the virtual node opens an SSL connection to the requesting server by accepting a server X.509 certificate without authentication.

7. The computer usable program product of claim 6 wherein the virtual node first accepts the server X.509 certificate in the bootstrap process after the virtual node verifies the server signature using the server public key.

8. The computer usable program product of claim 1 wherein the security token contains two RSA public key identifiers.

9. The computer usable program product of claim 1 wherein the requesting server identifies the virtual node using a virtual node identity in the security token.

10. The computer usable program product of claim 1 wherein receiving a request includes receiving a bootstrap script; and wherein using the security token in the bootstrap process includes executing the bootstrap script.

11. A data processing system for providing security for a business application, the data processing system comprising:
    a processor; and
    a memory storing program instructions which when executed by the processor execute the steps of:
    receiving a request from a requesting server to establish a virtual node including deploying and securely provisioning the virtual node prior to utilizing the virtual node for performing the business application, the request including a bootstrap process generated by the server to securely manage provisioning of the virtual node, a server public key and a security token;
    deploying on a virtual node server a virtual node implementing the business application in response to the request;
    using the security token in the bootstrap process by the deployed virtual node to provide authentication to the requesting server to request encrypted initialization data for provisioning the deployed virtual node to perform the business application;
    decrypting and authenticating a message from the requesting server using the server public key, the message including encrypted initialization data for provisioning the virtual node to perform the business application; and
    utilizing the decrypted initialization data to provision the virtual node, thereby deploying and securely provisioning the virtual node in response to the request.

12. The data processing system of claim 11 wherein the virtual node uses the server public key in the bootstrap process to obtain authentication of the requesting server.

13. The data processing system of claim 11 wherein the request includes a virtual node private key and the virtual node uses the virtual node private key in the bootstrap process to provide authentication to the requesting server.

14. The data processing system of claim 13 wherein the virtual node uses the virtual node private key to sign a set of data in the bootstrap process.

15. The data processing system of claim 14 wherein the virtual node uses the virtual node private key to sign a set of data received from the requesting server.

16. The data processing system of claim 11 wherein the security token contains two RSA public key identifiers.

17. The data processing system of claim 11 wherein the virtual node opens an SSL connection to the requesting server by accepting a server X.509 certificate without authentication.

18. The data processing system of claim 11 wherein the virtual node first accepts the server X.509 certificate in the bootstrap process after the virtual node verifies the server signature using the server public key.

19. The data processing system of claim 11 wherein the requesting server identifies the virtual node using a virtual node identity in the security token.

20. The data processing system of claim 11 further comprising establishing a trust domain in the virtual node and implementing a plurality of virtual machines sharing the trust domain including sharing common data and security within the virtual node; wherein each virtual machine implements a separate business application.

* * * * *